(12) United States Patent
Endel et al.

(10) Patent No.: US 10,871,300 B2
(45) Date of Patent: Dec. 22, 2020

(54) OPERATING HEATING, VENTILATION, AND AIR CONDITIONING SYSTEMS USING OCCUPANCY SENSING SYSTEMS

(71) Applicant: Honeywell International Inc., Morris Plains, NJ (US)

(72) Inventors: Petr Endel, Prague (CZ); Karel Marik, Revnice (CZ); Ondrej Holub, Prague (CZ)

(73) Assignee: Honeywell International Inc., Charlotte, NC (US)

( * ) Notice: Subject to any disclaimer, the term of this patent is extended or adjusted under 35 U.S.C. 154(b) by 34 days.

(21) Appl. No.: 16/224,670

(22) Filed: Dec. 18, 2018

(65) Prior Publication Data
US 2020/0191425 A1 Jun. 18, 2020

(51) Int. Cl.
*F24F 11/46* (2018.01)
*F24F 11/62* (2018.01)
*F24F 11/49* (2018.01)
*F24F 120/12* (2018.01)

(52) U.S. Cl.
CPC .............. *F24F 11/46* (2018.01); *F24F 11/49* (2018.01); *F24F 11/62* (2018.01); *F24F 2120/12* (2018.01)

(58) Field of Classification Search
CPC ......... F24F 11/46; F24F 11/62; F24F 2120/12
USPC ....................................................... 700/276
See application file for complete search history.

(56) References Cited

U.S. PATENT DOCUMENTS

| | | | |
|---|---|---|---|
| 9,842,129 B2 | 12/2017 | Hatami-Hanza | |
| 10,120,397 B1 | 11/2018 | Zakhor et al. | |
| 2010/0235004 A1* | 9/2010 | Thind | G05B 15/02 700/277 |
| 2012/0323376 A1* | 12/2012 | Honda | G05D 23/1932 700/276 |
| 2013/0158728 A1 | 6/2013 | Lee et al. | |
| 2016/0012340 A1* | 1/2016 | Georgescu | G05B 15/02 700/276 |
| 2016/0094445 A1 | 3/2016 | Sella et al. | |
| 2016/0139576 A1 | 5/2016 | Aiken et al. | |
| 2017/0105129 A1* | 4/2017 | Teplin | H04W 24/02 |
| 2018/0299153 A1 | 10/2018 | Ajax et al. | |
| 2018/0299845 A1* | 10/2018 | Ray | G06Q 10/063 |
| 2019/0171171 A1* | 6/2019 | Verteletskyi | G05B 19/042 |

OTHER PUBLICATIONS

EP Application No. 19216744, Extended European Search Report, pp. 7, dated Apr. 28, 2020.

* cited by examiner

*Primary Examiner* — Md Azad
(74) *Attorney, Agent, or Firm* — Seager Tufte & Wickhem LLP

(57) ABSTRACT

Operating HVAC systems using occupancy sensing systems is described herein. One device includes instructions to receive information defining a plurality of spaces of a building, occupancy sensing system information describing a location of each of a plurality of occupancy sensing system fixtures with respect to a representation of the building, and HVAC system information describing a relationship between the plurality of spaces and a plurality of HVAC devices in the building, create a mapping between a space, a fixture, and an HVAC device based on the building information, and modify an operation of the HVAC device based on the mapping and responsive to a determination of occupancy in the space by the fixture.

16 Claims, 8 Drawing Sheets

BUILDING SEGMENTS

| building_segment_ID | building_segment_name | building_segment_ID_orig |
|---|---|---|
| '1' | 'Bldg1,floor1' | '1' |
| '2' | ' Bldg1,floor2' | '34' |
| '3' | 'Bldg2' | '35' |

FLOORS

| floor_ID | floor_name |
|---|---|
| '1' | 'First floor' |
| '2' | 'Second floor' |

SPACES

| space_ID | space_name | space_ID_orig |
|---|---|---|
| 1 | 'HBS TRAINING LAB B 2-1414' | 532 |
| 2 | 'TRAINING 2-1412' | 533 |
| 3 | 'HBS TRAINING LAB A 2-1416' | 534 |
| 4 | 'TRAINING 2-1424' | 546 |
| 5 | 'AUDITORIUM 2-1450' | 547 |

HVAC EQUIPMENT

| hvac_ID | hvac_name | hvac_ID_orig |
|---|---|---|
| 1 | 'VAV_1_11_01' | 4463 |
| 2 | 'VAV_1_11_02' | 4464 |
| 3 | 'VAV_1_11_03' | 4465 |

FIXTURES

| fixture_ID | fixture_name | x_coordinate | y_coordinate | MAC_address | fixture_ID_orig |
|---|---|---|---|---|---|
| 1 | 'Sensor12f255' | '3721' | '1833' | '12:f2:55' | '1732' |
| 2 | 'Sensor13123e' | '3723' | '1786' | '13:12:3e' | '1733' |
| 3 | 'Sensor131350' | '3723' | '1880' | '13:13:50' | '1734' |

1140

FLOORS TO BUILDING SEGMENTS

| floor_ID | building_segment_ID | From Definitory tables | |
|---|---|---|---|
| '1' | '1' | First floor | Bldg 1, floor 1 |
| '1' | '3' | First floor | Bldg 2 |
| '1' | '4' | First floor | Bldg 3 |
| '1' | '5' | First floor | Silent Knight |
| '2' | '2' | Second floor | Bldg 1, floor 2 |

SPACES TO FLOORS

| space_ID | floor_ID | From Definitory tables | |
|---|---|---|---|
| 8 | 1 | TRAINING 2-1410 | First floor |
| 9 | 1 | TRAINING 2-1408 | First floor |

HVAC TO SPACES

| hvac_ID | space_ID | From Definitory tables | |
|---|---|---|---|
| 179 | 9 | VAV_2_04_01 | TRAINING 2-1408 |
| 179 | 361 | VAV_2_04_01 | CORRIDOR 2-1264 |
| 180 | 8 | VAV_2_04_02 | TRAINING 2-1410 |

OPERATING HEATING, VENTILATION, AND AIR CONDITIONING SYSTEMS USING OCCUPANCY SENSING SYSTEMS

TECHNICAL FIELD

The present disclosure relates to devices, systems, and methods for operating heating, ventilation, and air conditioning systems using occupancy sensing systems.

BACKGROUND

A heating, ventilation, and air conditioning (HVAC) system can be used to control the environment of a building. For example, an HVAC system can be used to control the air temperature, humidity, and/or air quality of a building. An HVAC system can be operated based on occupancy information. A determination of whether a space of a building is occupied, for example, may govern the operation of one or more HVAC devices dedicated to that space.

Previous approaches to operating HVAC systems based on occupancy may face issues associated with the separate nature of occupancy sensing systems and HVAC systems. For instance, occupancy sensing systems and HVAC systems may be installed and/or managed by different entities and thus may utilize different proprietary concepts, such as naming conventions and/or labels for spaces in the building. Additionally, some information associated with either occupancy sensing systems or HVAC systems may be difficult to obtain in a readily useful (e.g., machine-readable) format, as such information may be included in floor plans and/or schemas.

BRIEF DESCRIPTION OF THE DRAWINGS

FIG. 7 illustrates a building segments definitory table in accordance with one or more embodiments of the present disclosure.

FIG. 8 illustrates a floors definitory table in accordance with one or more embodiments of the present disclosure.

FIG. 9 illustrates a spaces definitory table in accordance with one or more embodiments of the present disclosure.

FIG. 10 illustrates an HVAC equipment definitory table in accordance with one or more embodiments of the present disclosure.

FIG. 12 illustrates a floor-to-building-segment mapping table in accordance with one or more embodiments of the present disclosure.

FIG. 13 illustrates a space-to-floor mapping table in accordance with one or more embodiments of the present disclosure.

FIG. 14 illustrates an HVAC-to-space mapping table in accordance with one or more embodiments of the present disclosure.

DETAILED DESCRIPTION

Figure 1:
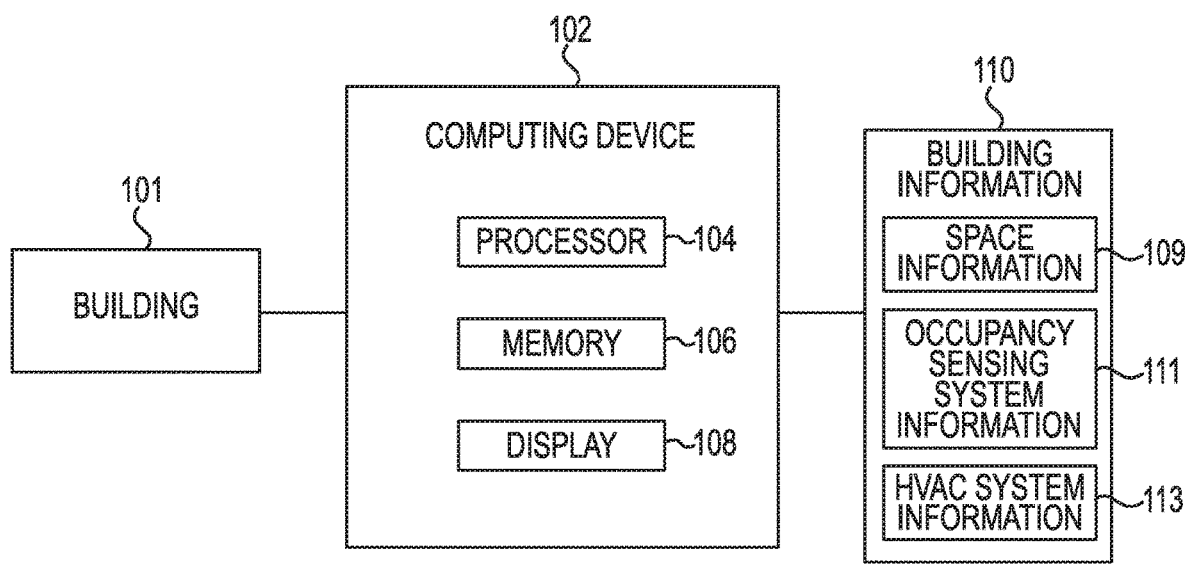
FIG. 1 illustrates a computing device for operating HVAC systems using occupancy sensing systems in accordance with one or more embodiments of the present disclosure.

Operating heating, ventilation, and air conditioning (HVAC) systems using occupancy sensing systems is described herein. For example, one or more embodiments include a non-transitory machine-readable medium having instructions stored thereon which, when executed by a processor, cause the processor to receive building information, wherein the building information includes space information defining a plurality of spaces of a building, occupancy sensing system information describing a location of each of a plurality of occupancy sensing system fixtures with respect to a representation of the building, and heating, ventilation, and air conditioning (HVAC) system information describing a relationship between the plurality of spaces and a plurality of HVAC devices installed in the building, create a mapping between a space of the plurality of spaces, a fixture of the plurality of fixtures, and an HVAC device of the plurality of HVAC devices based on the building information, and modify an operation of the HVAC device based on the mapping and responsive to a determination of occupancy in the space by the fixture.

Embodiments of the present disclosure can unite the often separate digital-ceiling-based occupancy sensing systems and HVAC systems in order to provide more informed HVAC operation. Increased human comfort and cost savings can be realized when an HVAC system is informed by occupancy information.

An HVAC system, as referred to herein, is a system used to control the environment of a building. For example, an HVAC system can be used to control the air temperature, humidity, and/or air quality of a building. An HVAC system can include a plurality of different devices and/or equipment, an example list including thermostats, fans, ducts, air conditioners, furnaces, humidifiers, variable air volume (VAV) devices (referred to herein as "VAVs"), air handling units (AHUs), rooftop units (RTUs), chillers, boilers, etc.

An occupancy sensing system (e.g., digital ceiling), as referred to herein, is a system used to detect the presence of a person in a given portion (e.g., space) of a building. Occupancy sensing systems can include motion detecting sensing devices (sometimes referred to herein as "occupancy sensors" or "sensors") employing infrared, ultrasonic, microwave, and/or other technologies, for instance. It is noted, however, that occupancy sensing systems are not limited herein to a particular type of sensor and/or sensing system.

A "space," as referred to herein, is a particular portion of a building. In some embodiments, a space can be defined by one or more structural elements (e.g., walls, doors, stairs, etc.). In some embodiments, a space may not be defined by one or more structural elements. In some embodiments, a space may refer to a single room. In some embodiments, a space may refer to more than one room. In some embodiments, a space may refer to a portion of a building (e.g., a polygon on a floorplan of a building) that is a subset of a larger room.

The term "digital ceiling," as used herein, refers generally to the usage of a building's plenum (e.g., space in the ceiling where wiring, cabling, and/or ductwork run) for placement of sensors and/or other network devices. In many instances, a digital ceiling may be installed in an existing building (e.g., the building may be retrofitted with a digital ceiling). In some embodiments, a digital ceiling may be partially embodied by occupancy sensors installed in, and/or associated with, existing fixtures of a building. Accordingly, where used herein, the term "digital ceiling" is an occupancy sensing system comprising a plurality of occupancy sensors installed near, in, or partially in, a ceiling of a building. A digital ceiling may refer to such sensors installed in ceiling-mounted light fixtures, for instance, though embodiments of the present disclosure are not so limited. In some embodiments, such occupancy sensing system sensors may be installed into light fixtures during refurbishment of the fixtures. The term "occupancy sensing system," where used herein, may refer to a digital ceiling.

An occupancy sensing system may be useful in operating an HVAC system in order to provide increased human comfort and/or save resources (e.g., cost, energy, etc.). As previously discussed, however, occupancy sensing systems and HVAC systems may be installed and/or managed by different entities. For example, an HVAC contractor may install the building's HVAC system, and a lighting contractor may install the building's occupancy sensing system. These entities may utilize different proprietary concepts, such as naming conventions and/or labels for spaces in the building. What is more, in cases where a building is retrofitted with an occupancy sensing system, the HVAC installation and occupancy sensing system installation may be separated by a number of years. Additionally, information associated with either occupancy sensing systems or HVAC systems may be difficult to obtain in a readily useful (e.g., machine-readable) format, as such information may be included merely in floor plans and/or schemas. These issues have frustrated previous approaches to the operation of an HVAC system using an occupancy sensing system.

The present disclosure can merge and/or unite occupancy sensing systems and HVAC systems. As discussed further below, embodiments herein can merge the disparate systems to create semantic mappings. Among other things, mappings can describe the relationships between fixtures (e.g., sensors) and spaces of a building. Mappings can describe the relationships between HVAC devices (e.g., VAVs) and spaces of a building. The mappings can be used by a computing device (e.g., computing device and/or controller) to link an HVAC device associated with a particular space to the fixture(s) installed in that space. Accordingly, the occupancy determinations made by the fixture(s) in the space can be used to operate the HVAC device. As a result, the computing device managing the building can operate more effectively to provide human comfort and can operate more efficiently to save resources in unoccupied spaces, for instance.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized, and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of manipulated variables" can refer to one or more manipulated variables.

FIG. 1 illustrates a computing device 102 for operating HVAC systems using occupancy sensing systems in accordance with one or more embodiments of the present disclosure. The computing device 102 can control the operation of the devices of an occupancy sensing system and/or an HVAC system installed in a building 101. Where the term "building" is used herein, is to be understood that such usage can refer to a single building and/or multiple buildings (e.g., a campus, compound, etc.).

As shown in FIG. 1, the computing device 102 can include a memory 106 and a processor 104. Memory 106 can be any type of storage medium that can be accessed by processor 104 to perform various examples of the present disclosure. For example, memory 106 can be a non-transitory computer readable medium having computer readable instructions (e.g., computer program instructions) stored thereon that are executable by processor 104 to receive building information 110, create mappings, and modify operations of HVAC devices in accordance with the present disclosure and as discussed further below. Stated differently, processor 104 can execute the executable instructions stored in memory 106 to perform these steps, and others, in accordance with the present disclosure.

Memory 106 can be volatile or nonvolatile memory. Memory 106 can also be removable (e.g., portable) memory, or non-removable (e.g., internal) memory. For example, memory 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 106 is illustrated as being located in the computing device 102, embodiments of the present disclosure are not so limited. For example, memory 106 can also be located internal to another computing resource (e.g., enabling computer readable instructions to be downloaded over the Internet or another wired or wireless connection).

As shown in FIG. 1, the computing device 102 includes a display (e.g., user interface) 108. A user (e.g., operator) of the computing device 102 can interact with the computing device 102 via the display 108. For example, display 108 can provide (e.g., display and/or present) information to the user of computing device 102, and/or receive information from (e.g., input by) the user of computing device 102. For instance, in some embodiments, display 108 can be a graphical user interface (GUI) that can include a screen that can provide and/or receive information to and/or from the user of the computing device 102. The display 108 can be, for instance, a touch-screen display. Additionally or alternatively, the computing device 102 can include a keyboard and/or mouse the user can use to input information into the computing device 102. Embodiments of the present disclosure, however, are not limited to a particular type(s) of display or interface.

Embodiments herein can include hardware, firmware, and/or logic that can perform a particular function. As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

The computing device 102 can receive building information 110. In some embodiments, building information 110 includes space information 109 that defines a plurality of spaces of the building 101. In some embodiments, building information 110 includes occupancy sensing system information 111 that describes a location of each of a plurality of fixtures of an occupancy sensing system installed in the building 101 with respect to a representation (e.g., graphical depiction) of the building 101. In some embodiments, building information 110 includes HVAC system information 113 that describes a relationship between the plurality of spaces and a plurality of HVAC devices installed in the building 101. It is noted that while the example of VAV devices is discussed herein for purposes of example, embodiments of the present disclosure do not limit HVAC devices to a particular number of devices or to a particular device type. For example, the HVAC system information 113 can describe a diffuser relationship between the VAV device of the plurality of VAV devices and a diffuser of a plurality of diffusers of the HVAC system, a boiler relationship between the VAV device of the plurality of VAV devices and a boiler of a plurality of boilers of the HVAC system, and/or a rooftop unit (RTU) relationship between the VAV device of the plurality of VAV devices and an RTU of a plurality of RTUs of the HVAC system.

In some embodiments, occupancy sensing system information 111 can be received from an occupancy sensing system associated with the building 101. For example, the computing device 102 can query an application programming interface (API) associated with the occupancy sensing system for the occupancy sensing system information 111. In some embodiments, the occupancy sensing system information 111 can be in a text format that describes each of a plurality of fixtures using a unique identifier and a unique set of coordinates. In some embodiments, building information 110 can be received from a building information model (BIM) associated with the building 101 (e.g., a file including a BIM associated with the building 101). For example, HVAC system information 113 and/or space information 109 can be determined from BIM files associated with the building 101. In some embodiments, an interface (e.g., the display 108) can be used to receive user inputs to define the building information 110. For instance, user inputs can define each of the plurality of spaces of the building 101 as a respective polygon in a building floorplan.

In some embodiments, the formats of the received building information 110 may be the same. In some embodiments, the formats of the building information may be different. For example, the occupancy sensing system information 111 may be received as a bitmap file and the HVAC system information 113 may be received as a BIM file. In some embodiments, the space information 109 can be received in a first format, the occupancy sensing system information 111 can be received in a second format, and the HVAC system information 113 can be received in a third format.

The building information 110 can describe the spaces of the building 101, the fixtures, and/or the HVAC information using a coordinate system. In some embodiments, different coordinate systems may be used. For example, the occupancy sensing system information 111 can describe a coordinate location of each of the plurality of fixtures with respect to a first coordinate system associated with the building 101, and the HVAC system information 113 can describe a coordinate location of each of the plurality of HVAC devices with respect to a second coordinate system associated with the building. The different coordinate systems may, for instance, result from the different entities that install and/or maintain the systems.

Figure 2:
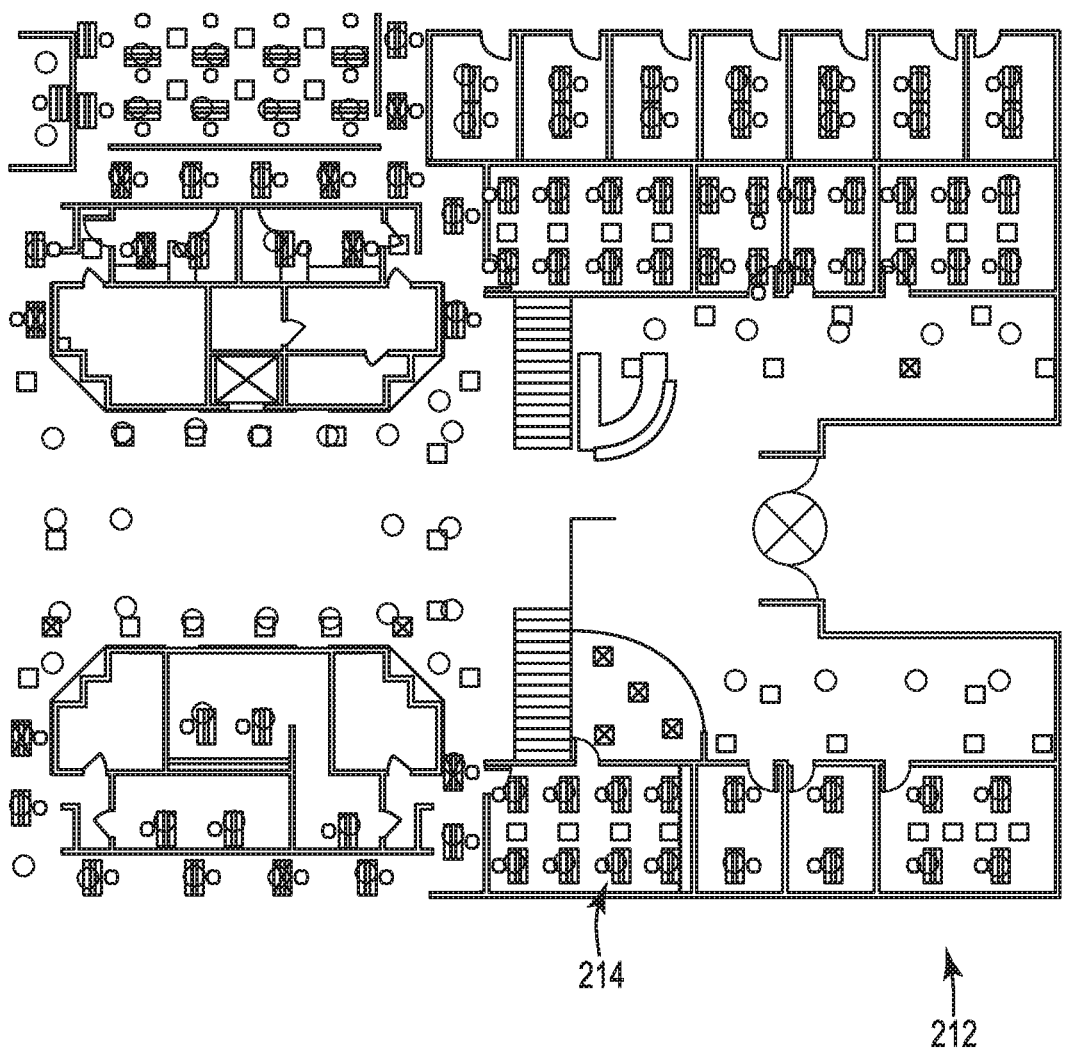
FIG. 2 illustrates a representation of a portion of a building that includes occupancy sensing system information associated with the building in accordance with one or more embodiments of the present disclosure.

FIG. 2 illustrates a representation 212 of a portion of a building that includes occupancy sensing system information associated with the building in accordance with one or more embodiments of the present disclosure. For instance, the representation 212 can be included in a bitmap file describing the occupancy sensing system of the building. Fixtures of the occupancy sensing system (e.g., motion sensors installed in lighting fixtures) are indicated in the representation 212 by circular display elements. For example, fixture 214 is indicated by a circular display element. The representation 212 (e.g., metadata associated with the representation 212) can include, for each fixture, a unique identifier and the coordinates (e.g., x, y coordinates) of the representation 212 where that fixture is found.

Figure 3:
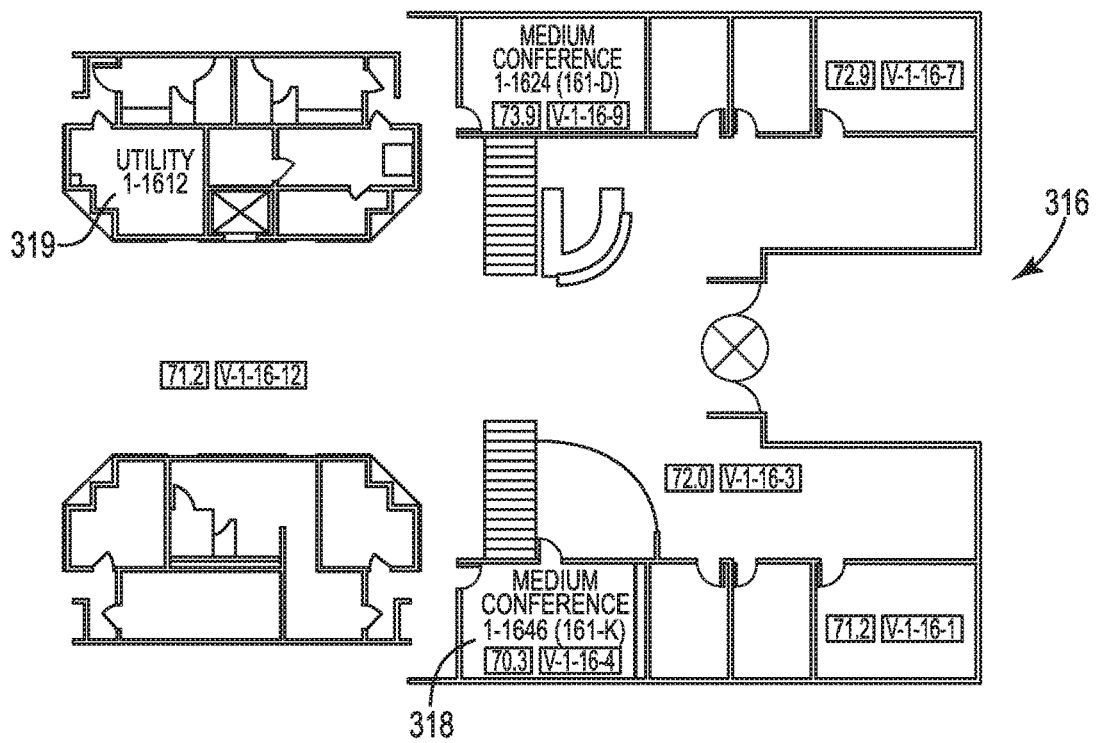
FIG. 3 illustrates another representation of the portion of the building that includes HVAC information and/or space information associated with the building in accordance with one or more embodiments of the present disclosure.

FIG. 3 illustrates another representation 316 of the portion of the building that includes HVAC information and/or space information associated with the building. For instance, the representation 316 can be included in a BIM file describing the building (e.g., spaces of the building and/or HVAC system devices of the building). Devices (e.g., VAVs) of the building are indicated in the representation 316 by a pair of display elements. For example, VAV 318 is indicated by a pair of display elements, one indicating a device identifier associated with the VAV 318 (e.g., V-1-16-4) and another indicating a current temperature supplied by the VAV 318 (e.g., 70.3 degrees Fahrenheit). The representation 316 (e.g., metadata associated with the representation 316) can include, for each device, the device identifier and the location where that device is found. The location of the device 318 in the BIM may be described using geographical coordinates (e.g., latitude and longitude), for instance, though embodiments herein are not so limited.

Spaces of the building are indicated in the representation 316 by a type and a space identifier. For example, space 319 is indicated by the type "Utility" and the space identifier "1-1612". The representation 316 (e.g., metadata associated with the representation 316) can include, for each space, the space identifier and the location where that space is found. The location of the space 319 in the BIM may be described using geographical coordinates (e.g., latitude and longitude), for instance, though embodiments herein are not so limited.

Figure 4:
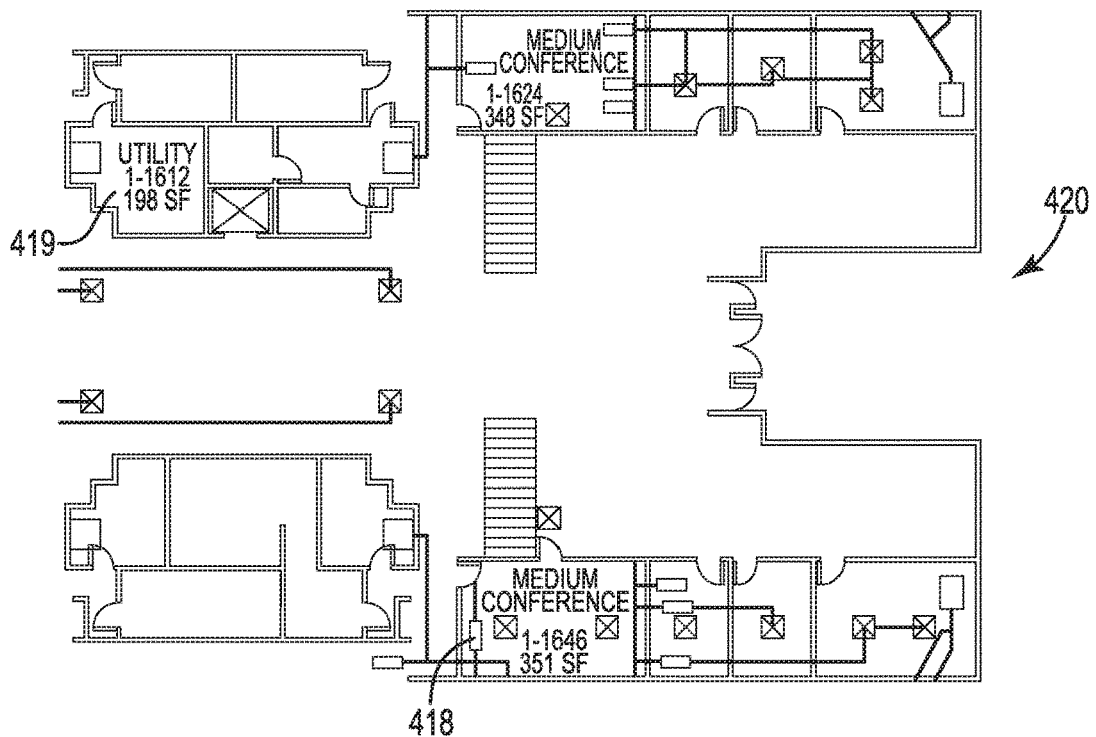
FIG. 4 illustrates another representation of the portion of the building that includes HVAC information and/or space information associated with the building in accordance with one or more embodiments of the present disclosure.

FIG. 4 illustrates another representation 420 of the portion of the building that includes HVAC information and/or space information associated with the building. For instance, the representation 420 can be included in a scalable vector graphics (SVG) and/or computer-aided design (CAD) file describing the building (e.g., spaces of the building and/or HVAC system devices of the building). In some embodiments, the representation 420 can be received from an architect and/or builder responsible for the construction of the building.

HVAC devices (e.g., VAVs) of the building are indicated in the representation 420 by rectangular display elements. For example, VAV 418 is indicated by a rectangular display element. The representation 420 (e.g., metadata associated with the representation 420) can include, for each device, a device identifier and the coordinates (e.g., x, y coordinates) of the representation 420 where that device is found (e.g., in a third coordinate system). It is noted that the coordinate system, and thus the coordinates for a particular HVAC device, fixture and/or space, used in the representation 420, the representation 212, and the representation 316 may differ.

Spaces of the building are indicated in the representation 420 by a type, a space identifier, and a size. For example, space 419 is indicated by the type "Utility," the space identifier "1-1612," and an indication that it is 198 square feet in size. The representation 420 (e.g., metadata associated with the representation 420) can include, for each space, a unique identifier and the coordinates (e.g., x, y coordinates) of the representation 420 where that space is found. In some embodiments, the representation 420 can include coordinates associated with indicators and/or structures defining the space, such as walls, doors, stairs, etc.

The computing device 102, previously described in connection with FIG. 1, can receive the representations 212, 316, and 420 and/or files along with the building information contained therein. In some embodiments, the representations can be operated upon in order to extract the building information therefrom. For instance, the computing device 102 can query an occupancy sensing system API and receive files (e.g., JavaScript Object Notation (JSON)) files that include fixture identifiers and coordinates. From this information, the computing device 102 can create a fixture file (e.g., a comma-separated values (CSV) file). The computing device 102 can load the fixture file and the SVG file describing the building, map the coordinate system used by the fixture file to the coordinate system used by the SVG file, and extract information describing the spaces served by the HVAC devices.

Figures 5, 6:
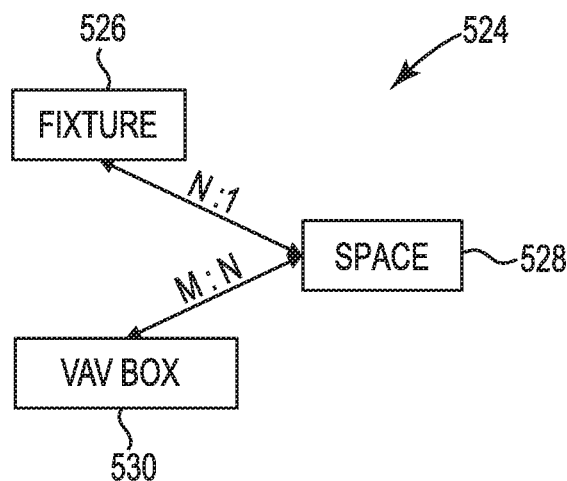
FIG. 5 illustrates a logical mapping associated with operating HVAC systems using occupancy sensing systems in accordance with one or more embodiments of the present disclosure.
FIG. 6 illustrates an output table associated with operating HVAC systems using occupancy sensing systems in accordance with one or more embodiments of the present disclosure.

Accordingly, the computing device 102 can create a mapping between a space of the plurality of spaces, a fixture of the plurality of fixtures, and an HVAC device of the plurality of HVAC devices based on the building information. FIG. 5 illustrates a logical mapping 524 associated with operating HVAC systems using occupancy sensing systems in accordance with one or more embodiments of the present disclosure. The mapping 524 may be referred to as an instance of an "ontology model" or a "semantic model." As shown in FIG. 5, the mapping 524 relates a space 528 of the building to a fixture 526 (or N quantity of fixtures) included therein. The mapping 524 additionally relates a space 528 (or N quantity of spaces) served by an HVAC (e.g., VAV) device 530 (or M quantity of HVAC devices). In some embodiments, a single space may be served by a single HVAC device. In some embodiments, multiple spaces may be served by a single HVAC device. In some embodiments, a single space may be served by multiple HVAC devices. It is to be understood that such variance results from differently sized spaces and different HVAC types, among other factors.

FIG. 6 illustrates an output table associated with operating HVAC systems using occupancy sensing systems in accordance with one or more embodiments of the present disclosure. The output table illustrated in FIG. 6 can be created by the computing device 102, previously described in connection with FIG. 1, for instance, based on the building information 110. The output table illustrated in FIG. 6 includes a plurality of items, each associated with a respective table such that selecting of the items causes display of the associated table. For instance, the output table illustrates in FIG. 6 includes an item 632 associated with a building segment definitory table, an item 634 associated with a floor definitory table, an item 636 associated with a spaces definitory table, an item 638 associated with an HVAC equipment (e.g., devices) definitory table, and an item 640 associated with a fixtures definitory table (cumulatively referred to as "definitory table items 632-640").

Selection of the item 632 can cause a building segment definitory table (illustrated in FIG. 7) to be displayed. Selection of the item 634 can cause a floor definitory table (illustrated in FIG. 8) to be displayed. Selection of item 636 can cause a spaces definitory table (illustrated in FIG. 9) to be displayed. Selection of the item 638 can cause an HVAC equipment definitory table (illustrated in FIG. 10) to be displayed. Selection of the item 640 can cause a fixtures definitory table (illustrated in FIG. 11) to be displayed.

In addition to the definitory table items 632-640, FIG. 6 includes an item 642 associated with a floor-to-building-segment mapping table, the selection of which can cause a floor-to-building-segment mapping table (illustrated in FIG. 12) to be displayed. FIG. 6 includes an item 644 associated with a space-to-floor mapping table, the selection of which can cause a space-to-floor mapping table (illustrated in FIG. 13) to be displayed. FIG. 6 includes an item 646 associated with a HVAC-to-space mapping table, the selection of which can cause an HVAC-to-space mapping table (illustrated in FIG. 14) to be displayed. FIG. 6 includes an item 648 associated with a fixture-to-space mapping table, the selection of which can cause a fixture-to-space mapping table (illustrated in FIG. 15) to be displayed.

FIG. 7 illustrates a building segment definitory table 732 in accordance with one or more embodiments of the present disclosure. As shown in FIG. 7, the table 732 can include identification numbers of building segments, the names of the building segments, and the names of the building segments as they appeared in the original representation (e.g., the building information). The term "building segment" can refer to a subset of building that is larger than a space. In some embodiments, for instance, a building segment can refer to a wing or area of the building. In some embodiments, a building segment can refer to a plurality of spaces.

FIG. 8 illustrates a floor definitory table 834 in accordance with one or more embodiments of the present disclosure. As shown in FIG. 8, the table 834 can include identification numbers of floors and the names of the floor.

FIG. 9 illustrates a spaces definitory table 936 in accordance with one or more embodiments of the present disclosure. As shown in FIG. 9, the table 936 can include identification numbers of spaces, the names of the spaces, and the names of the spaces as they appeared in the original representation (e.g., the building information).

FIG. 10 illustrates an HVAC equipment definitory table 1038 in accordance with one or more embodiments of the present disclosure. As shown in FIG. 10, the table 1038 can include identification numbers of HVAC devices (e.g., equipment), the names of the devices, and the names of the devices as they appeared in the original representation (e.g., the building information).

Figure 11:
FIG. 11 illustrates a fixtures definitory table in accordance with one or more embodiments of the present disclosure.

FIG. 11 illustrates a fixtures definitory table 1140 in accordance with one or more embodiments of the present disclosure. As shown in FIG. 11, the table 1140 can include identification numbers of fixtures, the names of the fixtures, the x-coordinates of the fixtures, the y-coordinates of the fixtures, the media access control (MAC) addresses of the fixtures, and the names of the fixtures as they appeared in the original representation (e.g., the building information).

FIG. 12 illustrates a floor-to-building-segment mapping table 1242 in accordance with one or more embodiments of the present disclosure. As shown in FIG. 12, the table 1242 can include identification numbers of floors mapped to identification numbers of building segments to which they belong, and floor names mapped to building segment names to which they belong. In some embodiments, floor names and/or building segment names may be descriptions of the identification numbers (e.g., to make them more readily understood by a reader) and may correlate with names in one or more of the definitory tables, previously discussed.

FIG. 13 illustrates a space-to-floor mapping table 1344 in accordance with one or more embodiments of the present disclosure. As shown in FIG. 13, the table 1344 can include identification numbers of spaces mapped to identification numbers of floors to which they belong, and space names mapped to floor names to which they belong. As previously discussed, space names and/or floor names may be descriptions of the identification numbers (e.g., to make them more readily understood by a reader) and may correlate with names in one or more of the definitory tables, previously discussed.

FIG. 14 illustrates an HVAC-to-space mapping table 1446 in accordance with one or more embodiments of the present disclosure. As shown in FIG. 1, the table 1446 can include identification numbers of HVAC devices mapped to identification numbers of spaces of which they provide ventilation, heating, and/or cooling, and HVAC device names mapped to space names of which they provide ventilation, heating, and/or cooling. In some embodiments, device names and/or space names may be descriptions of the identification numbers (e.g., to make them more readily understood by a reader) and may correlate with names in one or more of the definitory tables, previously discussed.

Figure 15:
FIG. 15 illustrates a fixture-to-space mapping table in accordance with one or more embodiments of the present disclosure.

FIG. 15 illustrates a fixture-to-space mapping table 1548 in accordance with one or more embodiments of the present disclosure. As shown in FIG. 15, the table 1548 can include identification numbers of fixtures mapped to identification numbers of spaces in which they are installed, and fixture names mapped to space names in which they are installed. In some embodiments, fixture names and/or space names may be descriptions of the identification numbers (e.g., to make them more readily understood by a reader) and may correlate with names in one or more of the definitory tables, previously discussed.

Using one or more of the tables illustrated in FIGS. 7-15, a computing device (e.g., the computing device 102, previously described in connection with FIG. 1) can control the operation of HVAC devices to provide improved human comfort (e.g., provide ventilation, heating, and/or cooling) and/or save energy. The tables illustrated in FIGS. 7-15 provide a link between a space and the HVAC device(s) associated with that space (e.g., configured to provide ventilation, heating, and/or cooling in that space) and the fixture(s) associated with that space.

For example, referring back to FIGS. 2-4, if the fixture 214 determines occupancy, it can send a signal indicating that determination which can be received by the computing device. Because of the mapping(s) determined by embodiments herein, the space in which the fixture 214 is installed (e.g., "Medium Conference 1-1646") is known to be associated with a VAV device 318 (also illustrated in FIG. 4 as VAV device 418). In some embodiments, upon the determination of occupancy, the computing device can cause the VAV device 318 to be activated. In some embodiments, upon the determination of occupancy, the computing device can cause the VAV device 318 to modify its operation (e.g., set a temperature and/or airflow setpoints).

If the fixture 214 makes a determination that the space "Medium Conference 1-1646" is unoccupied, it can send a signal indicating that determination which can be received by the computing device. In some embodiments, upon the determination that a space is unoccupied, the computing device can cause the VAV device 318 to be deactivated. In some embodiments, upon the determination that a space is unoccupied, the computing device can cause the VAV device 318 to modify its operation (e.g., set a temperature and/or airflow setpoints).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory machine-readable medium having instructions stored thereon which, when executed by a processor, cause the processor to:
   receive building information, wherein the building information includes:
      occupancy sensing system information describing a coordinate location of each of a plurality of occupancy sensing system fixtures with respect to a first coordinate system associated with the building;

heating, ventilation, and air conditioning (HVAC) system information describing a coordinate location of each of the plurality of HVAC devices with respect to a second coordinate system associated with the building; and space information defining a plurality of spaces of the building with respect to a third coordinate system;

create a mapping between a space of the plurality of spaces, a fixture of the plurality of fixtures, and an HVAC device of the plurality of HVAC devices based on the building information; and modify an operation of the HVAC device based on the mapping and responsive to a determination of occupancy in the space by the fixture;

wherein at least one of the first coordinate system, the second coordinate system and the third coordinate system are different from others of the first coordinate system, the second coordinate system and the third coordinate system.

2. The medium of claim 1, including instructions to:
receive the space information defining the plurality of spaces in a first format;
receive the occupancy sensing system information in a second format; and
receive the HVAC information in a third format.

3. The medium of claim 2, including instructions to create the mapping in a fourth format.

4. The medium of claim 1, including instructions to create a table that maps each fixture of the plurality of fixtures to a respective space of the plurality of spaces.

5. The medium of claim 1, including instructions to create a table that maps each HVAC device of the plurality of HVAC devices to a respective space of the plurality of spaces.

6. The medium of claim 1, including instructions to receive the HVAC system information describing the relationship between the plurality of spaces and a plurality of variable air volume (VAV) devices installed in the building and create a table that maps each VAV device of the plurality of VAV devices to a respective space of the plurality of spaces.

7. A system, comprising:
a plurality of variable air volume (VAV) devices of a heating, ventilation, and air conditioning (HVAC) system installed in a building, where the plurality of VAV devices were installed in the building by a first entity over a first timeframe associated with a construction of the building;
a plurality of fixtures of an occupancy sensing system installed in the building, where the plurality of fixtures of the occupancy sensing system were installed in the building by a second entity over a second timeframe associated with a subsequent retrofitting of the building; and
a computing device including a processor and a memory having instructions stored thereon which, when executed by the processor, cause the processor to:
receive building information, wherein the building information includes:
information defining a plurality of spaces of the building;
occupancy sensing system information describing a location of each of the plurality of fixtures with respect to a representation of the building; and
HVAC system information describing a relationship between the plurality of spaces and the plurality of VAV devices;

create a mapping between a space of the plurality of spaces, a fixture of the plurality of fixtures, and a VAV device of the plurality of VAV devices based on the building information; and
modify an operation of the VAV device based on the mapping and responsive to a determination of occupancy in the space by the fixture.

8. The system of claim 7, wherein the building information includes HVAC system information describing a diffuser relationship between the VAV device of the plurality of VAV devices and a diffuser of a plurality of diffusers of the HVAC system, and wherein the instructions include instructions to modify an operation of the diffuser, based on the diffuser relationship and the mapping, responsive to the determination of occupancy in the space by the fixture.

9. The system of claim 7, wherein the building information includes HVAC system information describing a boiler relationship between the VAV device of the plurality of VAV devices and a boiler of a plurality of boilers of the HVAC system, and wherein the instructions include instructions to modify an operation of the boiler, based on the boiler relationship and the mapping, responsive to the determination of occupancy in the space by the fixture.

10. The system of claim 7, wherein the building information includes HVAC system information describing a rooftop unit (RTU) relationship between the VAV device of the plurality of VAV devices and an RTU of a plurality of RTUs of the HVAC system, and wherein the instructions include instructions to modify an operation of the RTU, based on the RTU relationship and the mapping, responsive to the determination of occupancy in the space by the fixture.

11. A method of operating a heating, ventilation, and air conditioning system using an occupancy sensing system, comprising:
receiving space information defining a plurality of spaces of a building;
receiving occupancy sensing system information as an image file describing a location of each of a plurality of fixtures of an occupancy sensing system installed in the building with respect to a representation of the building; and
receiving heating, ventilation, and air conditioning (HVAC) information describing a relationship between the plurality of spaces and a plurality of variable air volume (VAV) devices installed in the building, where the HVAC information and the space information are received from a building information model (BIM) associated with the building;
creating a mapping between a space of the plurality of spaces, a fixture of the plurality of fixtures, and a VAV device of the plurality of VAV devices based on the space information, the occupancy sensing system information, and the HVAC information; and
modifying an operation of the VAV device based on the mapping and responsive to a determination of occupancy in the space by the fixture.

12. The method of claim 11, wherein the method includes querying an application programming interface associated with the occupancy sensing system.

13. The method of claim 12, wherein the method includes receiving the occupancy sensing system information in response to the query in a text format describing each of the plurality of fixtures using a unique identifier and a unique set of coordinates.

14. The method of claim 11, wherein the method includes providing an interface configured to receive user inputs to define each of the plurality of spaces of the building as a respective polygon in a floorplan associated with the building.

15. The method of claim 11, wherein the method includes receiving the HVAC information and the space information from a BIM file associated with the building.

16. The method of claim 11, wherein the method includes receiving the occupancy sensing system information as a bitmap file describing the location of each of the plurality of fixtures of the occupancy sensing system installed in the building with respect to the representation of the building.

\* \* \* \* \*